March 23, 1965  D. E. STOKES ETAL  3,174,229
DRYING APPARATUS OF ELONGATED HEATED CONDUIT TYPE
Filed Feb. 26, 1962  3 Sheets-Sheet 1
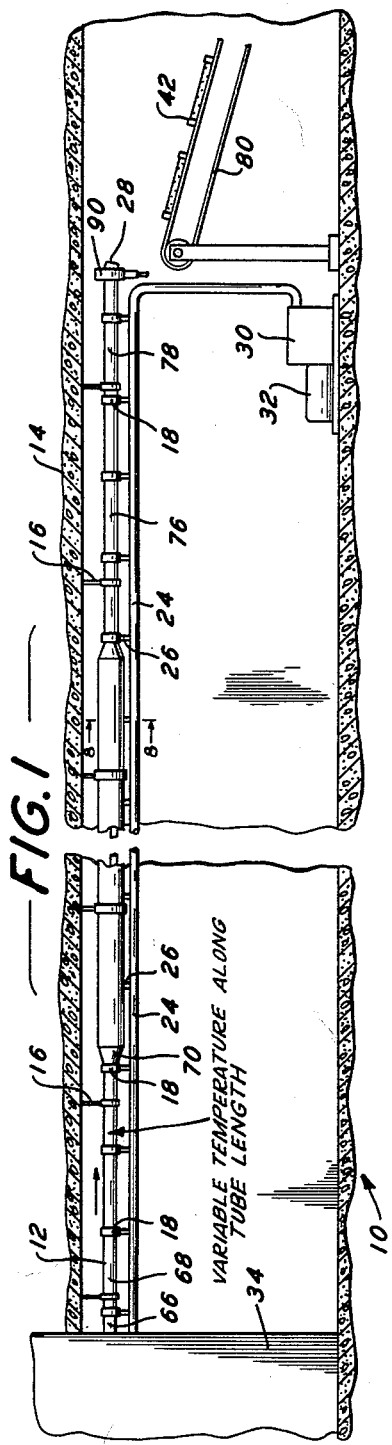
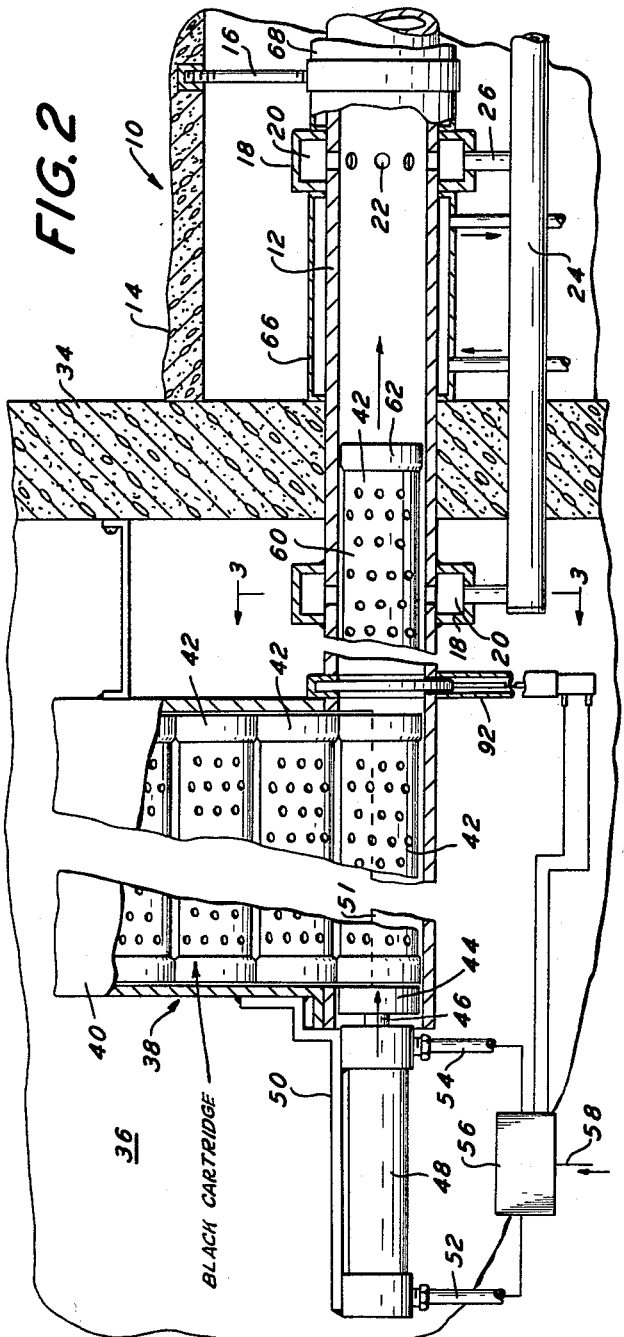
INVENTORS
DAVID E. STOKES
JAMES W. RYAN
BY
ATTORNEY

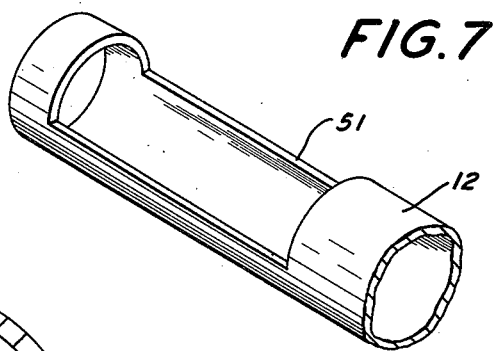
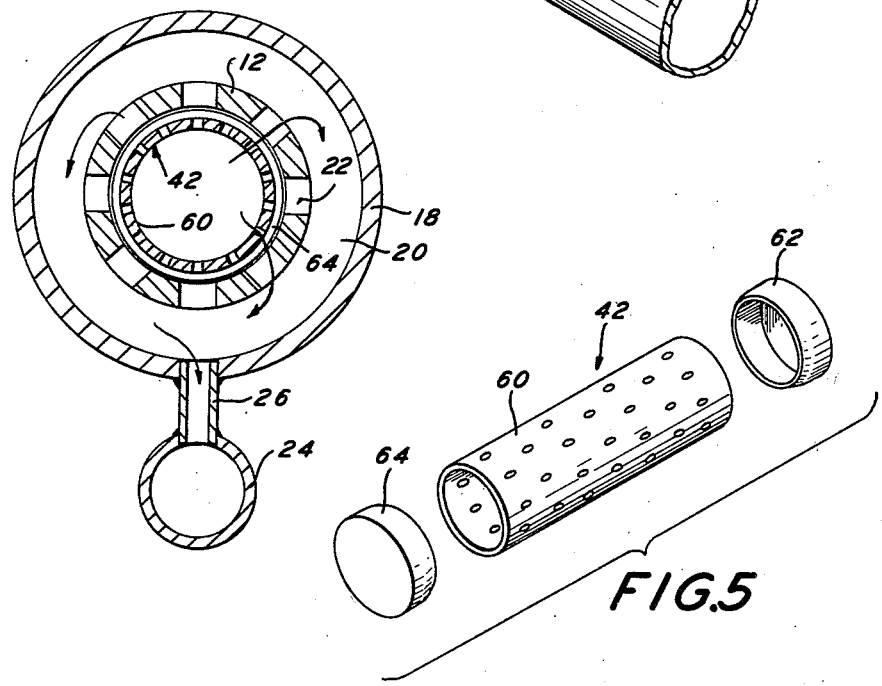
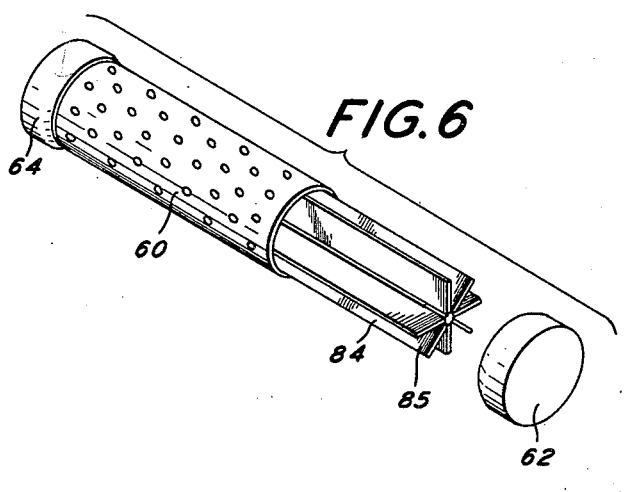
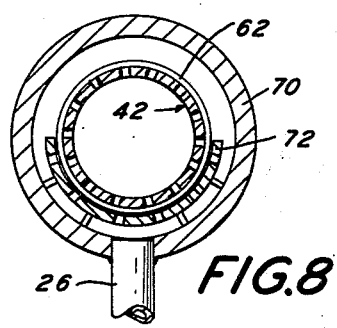

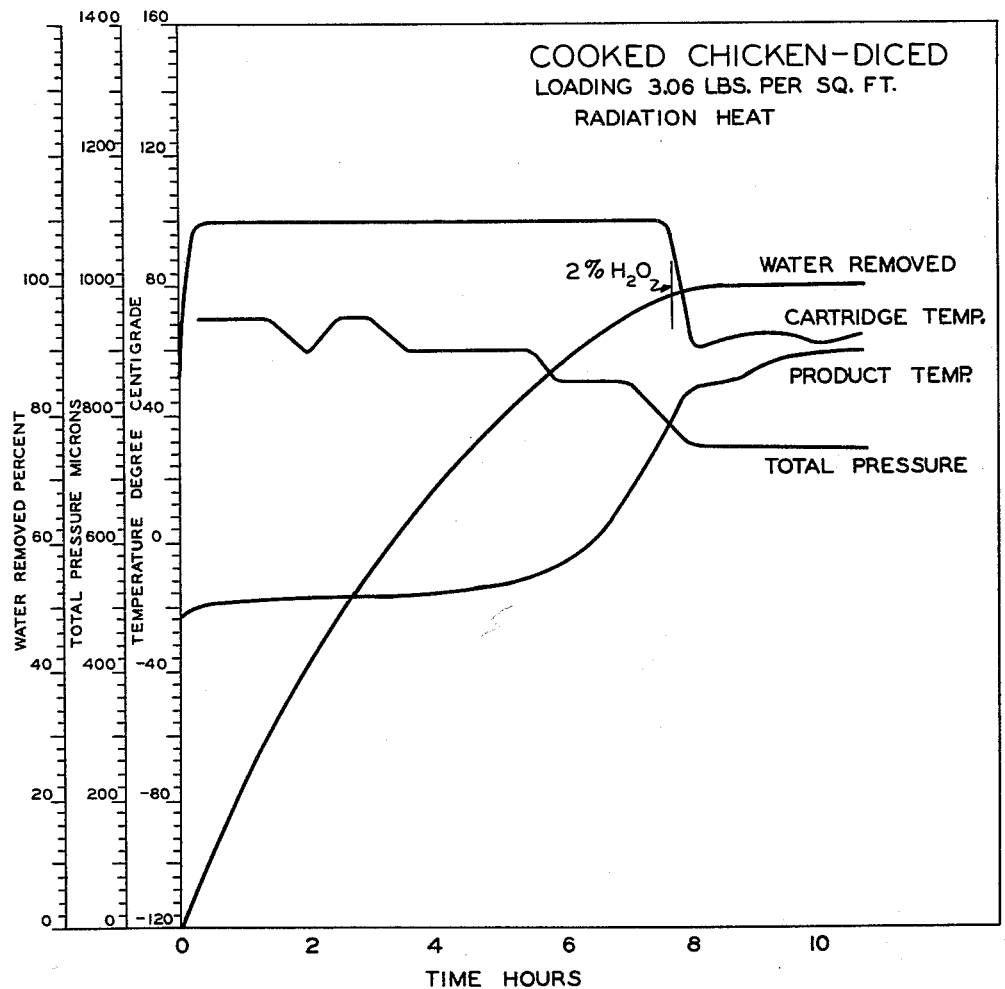
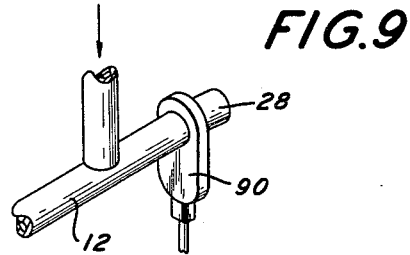

United States Patent Office 3,174,229
Patented Mar. 23, 1965

3,174,229
DRYING APPARATUS OF ELONGATED HEATED
CONDUIT TYPE
David E. Stokes, Jenkintown, and James W. Ryan,
Feasterville, Pa., assignors, by mesne assignments, to
Pennsalt Chemicals Corporation, Philadelphia, Pa., a
corporation of Pennsylvania
Filed Feb. 26, 1962, Ser. No. 176,184
10 Claims. (Cl. 34—92)

This invention relates to a continuous drying apparatus and method for continuously drying articles. More particularly, the present invention is directed to an apparatus and method for continuously vacuum drying or freeze drying articles.

Heretofore, numerous devices and methods have been proposed for vacuum drying or freeze drying articles. Vacuum drying includes subjecting articles to a vacuum and elevated temperature. Freeze drying comprehends subjecting frozen articles to an evacuated atmosphere and a controlled elevated temperature for a sufficient length of time so that all moisture in the articles will be sublimed. Any one of a wide variety of articles may be freeze dried in accordance with the present invention. For example, the present invention may be utilized to freeze dry food products, coffee, pharmaceuticals, blood, milk, biological specimens, etc.

Industry is making wide use of freeze drying techniques. Freeze drying of articles is desirable since they may be stored indefinitely without refrigeration. Food products may be processed in this manner without impairment or loss of fresh natural flavor, vitamin content or quality.

Heretofore, the devices and methods for freeze drying articles operated in a batch cycle. That is, the devices produced freeze dried products in batches. The present invention distinguishes from the devices and methods proposed heretofore by providing an apparatus and method which may continuously freeze dry articles or vacuum dry articles in a manner which is continuous. Hence, the present invention comprehends an apparatus and method wherein articles are continuously freeze dried twenty-four hours a day with little or no maintenance or supervision. The only maintenance or supervision required is the services of an operator who periodically checks the inventory of articles to be dried in the feeding mechanism.

The present invention comprehends apparatus which will require little or no floor space. Hence, the apparatus of the present invention comprehends the use of conduits or the like which are suspended from a wall or ceiling or otherwise supported above the floor of a building or the like. The drying process takes place in an elongated conduit which may be supported in serpentine fashion so as to make maximum utilization of the available space in a building or the like which is not otherwise utilized. The present invention may utilize a conduit having a length up to one hundred feet or more. Preferably, the conduit of the present invention will have a length of two hundred feet. However, the length of the conduit may be increased or decreased as desired. Hence, it is within the scope of the present invention to utilize a plurality of parallel short tubes. Increasing the length of the conduit results in an increase in the production rate.

It is an object of the present invention to provide a novel drying apparatus for continuously drying articles.

It is another object of the present invention to provide a novel continuous freeze drying apparatus.

It is another object of the present invention to provide a novel method of drying articles.

It is another object of the present invention to provide a novel method for continuously freeze drying articles.

It is still another object of the present invention to provide a novel apparatus and method for coninuously drying articles within an elongated conduit having larger transverse dimensions in a central portion thereof.

It is still another object of the present invention to provide a novel apparatus and method for continuously freeze drying articles in a manner which requires a minimum amount of handling and provides uniform quality.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a side elevation view of the present invention.

FIGURE 2 is an enlarged sectional view of the left-hand end of the apparatus illustrated in FIGURE 1.

FIGURE 3 is a sectional view taken along the lines 3—3 in FIGURE 2.

FIGURE 4 is a graph illustrating a typical temperature versus time curve for freeze drying an article.

FIGURE 5 is an exploded view of a cartridge within which the article being freeze dried may be disposed during the freeze drying process.

FIGURE 6 is an exploded view of another embodiment of the cartridge within which the article may be disposed during the freeze drying process.

FIGURE 7 is a partial perspective view of the left-hand end of the conduit within which drying takes place.

FIGURE 8 is a sectional view taken along the lines 8—8 in FIGURE 1.

FIGURE 9 is a perspective view of a terminal portion of the main conduit with an alternative means for introducing heat thereinto.

Referring to the drawing in detail, wherein like numerals indicate like elements, there is shown in FIGURE 1 an apparatus for drying articles designated generally as 10.

The apparatus 10 and the method of drying articles in accordance with the present invention may be utilized for vacuum drying or freeze drying articles. For purposes of illustration, the present discussion will be specifically directed to use of the apparatus 10 for freeze drying articles.

The apparatus 10 includes an elongated conduit 12. The conduit 12 may have a diameter of approximately six inches and may have a length of one hundred feet or more. For purposes of the present discussion, it will be assumed that the conduit 12 has a length of two hundred feet. The conduit 12 is illustrated as being supported from a ceiling 14 by means of brackets 16. Brackets 16 depend from the ceiling 14 and embrace the conduit 12 at spaced points therealong. The conduit 12 may alternatively be supported from an upright wall or on an upright standard. Since the conduit 12 is supported by a ceiling and in close approximation thereto, the conduit 12 does not interfere with any of the activities within the area within which it is disposed and occupies no floor space. Hence, the type of area within which the conduit 12 is disposed is immaterial.

As shown more clearly in FIGURE 2, a housing 18 surrounds the conduit 12 at spaced points therealong. The housing 18 includes an annular chamber 20 which surrounds the pipe 12. The annular chamber 20 is in communication with the interior of the conduit 12 by means of a plurality of holes 22 extending through the walls of the conduit 12.

A conduit 24 extends generally parallel to the conduit 12, as shown more clearly in FIGURE 3. The conduit 24 may be of smaller diameter than the conduit 12 as illustrated. The conduit 24 is supported by the conduit 12 by means of connector pipes 26. The connector pipes 26 provide communication between each of the chambers 20 and the interior of the conduit 24.

As shown more clearly in FIGURE 1, the conduit 12 is provided with a discharge end 28. The end of the conduit 24 adjacent the end 28 is in communication with a condenser 30 which in turn is in communication with a vacuum pump 32. Two or more condensers are preferred so that one will be in service while the other is being defrosted. The discharge port of the pump 32 may be in communication with atmosphere.

The lefthand end of the conduit 12 in FIGURE 1 extends through a wall 34 into a refrigerated room 36 as shown more clearly in FIGURE 2. A feeding mechanism designated generally as 38 is coupled to the lefthand end of the conduit 12. Such feeding mechanism includes a hopper or housing 40 within which a plurality of cartridges 42 are stacked one on top of the other. The lowermost cartridge in the stack is supported by the inner peripheral surface of the conduit 12. In this regard, it will be appreciated that the bottom of the housing 38 is in communication with the interior of the conduit 12.

An automatic device is provided to automatically feed the cartridges 42 into the conduit 12 one at a time. Such a device includes a piston 44 disposed within the conduit 12. The piston 44 is connected to a piston rod 46 which extends into a power cylinder 48. The power cylinder 48 is supported from the housing 40 by means of a bracket 50. The cartridges 42 enter the conduit 12 through slot 51 shown more clearly in FIGURE 7.

A conduit 52 has one end in communication with the lefthand end of the cylinder 48. A conduit 54 has one end in communication with the righthand end of the cylinder 48. The ends of the conduits 52 and 54 remote from the cylinder 48 are connected to a time operated supply and exhaust valve 56. A motive fluid such as air is supplied to the valve 56 by means of conduit 58.

The articles to be dried are disposed within black cartridges 42 of high emissivity during the drying process. As shown more clearly in FIGURE 5, the cartridges 42 include a hollow perforated sleeve 60 having imperforate end caps 62 and 64. We have found that the perforations should have an area, which as a minimum, is 15% of the area of sleeve 60. The outer peripheral diameter of the end caps 62 and 64 is slightly less than the inner peripheral diameter of the conduit 12. Hence, the end caps 62 and 64 provide a seal between the conduit 12 and the opposite ends of the cartrdiges 42. The cartridges 42 may have a length corresponding with the distance between adjacent housings 18. The distance from the housing 40 and the first housing 18 corresponds to approximately one-half the length of the cartridges 42. Hence, each cartridge 42 will have its interior in communication with one of the chambers 20 at all times except when the cartridge is moving from one position to the next adjacent position along the length of the conduit 12.

Means are provided to vary the temperature along the length of the conduit 12. FIGURE 4 discloses a graph of temperature versus time which is an empirical graph for a typical product which may be freeze dried such as chicken. When the articles being freeze dried are disposed within the housing 40, they are maintained in a frozen state due to the environment in the room 36. As shown more clearly in FIGURE 2, a temperature control jacket 66 surrounds a portion of the conduit 12. A temperature control jacket 68 surrounds the next adjacent portion of the conduit 12. A temperature control jacket surrounds the entire length of the conduit 12 between the wall 34 and the end 28. For purposes of illustration, a character numeral will not be given to each of the temperature control jackets. The various temperature control jackets, such as jackets 66, 68, 70, 76 and 78 will cause radiant heat to be transmitted to the product as it travels along the length of the conduit 12 in accordance with the empirical graph in FIGURE 4. It is to be noted that water and/or steam may be utilized to control the temperature along the length of the conduit 12. Alternatively, the temperature along the conduit 12 may be controlled by an electrical heater coil. The temperature adjacent a central section 70 of the conduit 12 will be higher than the temperature at either end thereof.

The central portion of the conduit 12 includes an enlarged diameter section 70 having a semi-circular support 72 spaced radially inwardly thereof. The support 72 is supported from the inner surface of section 70 by spacers 74. Support 72 is a continuation of the bottom half of conduit 12. The section 70 is of larger diameter to minimize pressure drop and provide adequate clearance for conductance of vapor.

Articles which have been freeze dried in accordance with the present invention will automatically discharge from the end 28. A conveyor belt 80 may be provided beneath the end 28 to receive the freeze dried articles. Alternatively, a container or other receptacle may be disposed beneath the end 28 to receive the freeze dried articles.

As shown more clearly in FIGURE 6, the cartridges 42 may have a spacer 84 within the sleeve 60. The spacer 84 preferably includes webs 85 which provide a plurality of isolated segmental chambers within which the articles to be freeze dried will be disposed. The articles to be freeze dried are preferably disposed within the segmental chambers formed by the spacer 84 in a loose manner so as to provide maximum exposed surface area. Other configurations for the spacer 84 may be provided if desired. The thickness of the webs 85 are preferably at least .5% of the diameter of the cartridge 42. In this manner, the webs 85 will have sufficient thickness to adequately conduct heat from sleeve 60 to increase transmission of heat to central portions of the product being dried.

A valve such as gate valve 90 may be provided to control the outlet end of conduit 12. A gate valve 92 may be provided at the inlet end of conduit 12. Each of valves 90 and 92 will be provided with an actuator which causes the valves to open and close simultaneously in timed relation with movement of piston 44. The periodic opening and closing of valves 90 and 92 introduced pulses of air into the partially evacuated conduit 12 to increase heating of the product by convection, and thereby decrease the length of time for the drying cycle.

The apparatus and method of the present invention operates as follows:

If the articles are to be freeze dried, the feeding mechanism 38 will be disposed within a refrigerated room 36. Hence, the articles will be in a frozen state within the cartridges 42. A sufficient number of cartridges 42 may be disposed within the housing 40 so that the apparatus may operate automatically over an extended period of time without requiring the attention of an operator. The conduit 12 is preferably filled with empty cartridges when operation of the apparatus is initiated. If valves 90 and 92 are not provided, the end caps 62 and 64 on the first and last cartridge 42 will constitute the seal at the ends of the conduit 12. Thereafter, the time operated supply and exhaust valve 56 will be initiated to supply motor fluid through conduit 52 into the lefthand end of the cylinder 48.

When motor fluid is introduced into the lefthand end of the cylinder 48, a piston connected to the piston rod 46 moves to the right in FIGURE 2. Such movement causes the piston 44 to push the lowermost cartridge 42 into the conduit 12 to a position wherein the chamber 20 will be in communication with only that portion of the conduit 12 between the end caps 62 and 64 as shown more clearly in FIGURE 2. Simultaneous with such movement of piston 44, valves 90 and 92 will be open. As soon as piston 44 reciprocates to the position in FIGURE 2, valves 90 and 92 close.

At this point, the article or product to be freeze dried will be subjected to the vacuum in chamber 20. After a predetermined period of time, the piston 44 will have returned to the position illustrated in FIGURE 2 and will push the next cartridge into the position occupied by the first cartridge.

The above sequence of events is repeated cyclically. At all times, each cartridge will have the article to be freeze dried in communication with a chamber 20. The elevated temperature environment and reduced pressure causes the ice in the frozen articles to sublime. The resultant moisture is withdrawn from the conduit 12 by way of conduit 24. Such resultant moisture is removed by the condenser 30. The end caps 62 and 64 provide a seal between each cartridge and the inner peripheral surface of the conduit 12. If the cartridges 42 are approximately one foot long, and the conduit 12 is approximately two hundred feet long, it will take approximately eight hours for the articles to be freeze dried. Hence, freeze dried articles will be produced at the rate of twenty-five feet per hour, twenty-four hours a day. As the length of the conduit 12 increases, the rate of production also increases. The eight hour drying cycle is merely illustrative and may be substantially decreased by methods known to those skilled in the art.

While the cartridges 42 are in abutting contact with each other and are caused to move through the conduit 12 by means of the piston 44, it will be appreciated that other devices may be substituted for the conveying means. For example, the cartridges 42 could be propelled through the conduit 12 by means of a conveyor belt, chain belt, etc. When a conveyor type device is utilized, a flexible seal or pivotable door must be provided at opposite ends of the conduit 12 to assure that the required pressure is maintained within the conduit 12.

As will be evident from FIGURE 4, most of the moisture is removed from the product during the first half of the cycle. A substantial period of time is required to remove the last few percentage of the moisture. The time period for the cycle can be decreased if the product is heated by microwave and/or R.F. wave energy during the latter portion of the cycle. As illustrated in FIGURE 9, a wave tube may be connected to tube 12 to conduct such wave energy to the product. Accordingly, it will be obvious that such a heating means may be substituted for the jackets between end 28 and section 70 on conduit 12. Wave energy of this nature attacks the ice and not the product and therefore may be advantageously used to reduce the time period for the last portion of the cycle.

Microwaves are electromagnetic waves having a wavelength in the microwave region. The microwave region is that portion of the electromagnetic spectrum lying between the far infared and the conventional radio frequency portion.

If desired, the article or product could be heated by providing electrical contacts within conduit 12. The cartridges are generally made of aluminum and hence are good conductors. Accordingly, the electrical potential could be coupled directly to the cartridges and the amount of heat introduced to the product could be varied by varying the amount of potential coupled to the cartridges as the cartridges pass through the conduit.

It is within the scope of the present invention to utilize a plurality of spaced parallel short tubes or conduit. The rate of production per conduit is small if the conduit is short, however this is compensated for by having a bank of such conduits. If desired, the articles to be freeze dried may be frozen while in the conduit at the inlet end thereof. Hence, the step of feeding the cartridges into the conduit need not be accomplished after the articles are frozen.

The present invention may be embodied in other specific forms without departing from the spirit or essential attributes thereof and, accordingly, reference should be made to the appended claims, rather than to the foregoing specification as indicating the scope of the invention.

We claim:

1. A drying apparatus for articles containing moisture comprising an elongated conduit, means for reducing the pressure in said conduit, means for selectively introducing heat into said conduit at spaced points along the length of said conduit with the highest temperature being in an intermediate portion of said conduit, said intermediate conduit portion having a greater transverse dimension than the end portions thereof, whereby pressure drop is minimized and adequate clearance for the conductance of moisture vapor generated by the heating of said articles is provided, and means for cyclically feeding articles to be dried into one end of said conduit, said conduit having a discharge end remote from said one end from which dried articles are dispensed.

2. A drying apparatus for articles containing moisture comprising a first elongated conduit, means for reducing the pressure in said first conduit at spaced points therealong to maintain a substantially uniform reduced pressure in said conduit, said means including a second elongated conduit spaced to one side of said first conduit, a plurality of manifold chambers communicating said first conduit with said second conduit at spaced points along said first conduit, a vacuum source, means communicating said vacuum source with an end of said second conduit for drawing air from said first conduit through said manifold chambers and second conduit, means for selectively introducing heat into said first conduit at spaced points therealong, and means for cyclically feeding articles to be dried into one end of said conduit, said conduit having a discharge end remote from said one end from which dried articles are dispensed.

3. A drying apparatus from frozen articles comprising a refrigerated chamber for maintaining said frozen articles in their frozen state, an elongated conduit extending from said chamber, said conduit having an inlet end within said chamber and a discharge end without said chamber, means for cyclically feeding articles to be dried into the inlet end of said conduit within said chamber, means at spaced points along said conduit for reducing the pressure within said conduit, and means for selectively introducing heat into said conduit at spaced points therealong, said discharge end of the conduit being remote from said inlet end and from which dried articles are dispensed.

4. A freeze drying apparatus comprising an elongated conduit, means for reducing the pressure in said conduit, means for introducing heat into said conduit at spaced points along the length of said conduit with the highest temperature being in an intermediate portion of said conduit, cartridges positioned in said conduit within which articles to be freeze dried are disposed, said cartridges having end cap portions, the end cap portions of said cartridges having a transverse dimension substantially equal to the inner dimension of said conduit, a central portion of each cartridge being a perforated sleeve, with the preforations occupying at least 15% of the area of the sleeve, and means for cyclically feeding said cartridges into one end of said conduit, and said conduit having a discharge end remote from said one end from which said cartridges are dispensed.

5. A freeze drying apparatus comprising an elongated conduit, means for reducing the pressure in said conduit, means for introducing heat into said conduit at spaced points along the length of said conduit with the highest temperature being in an intermediate portion of said conduit, perforated cartridges within said conduit within which articles to be freeze dried are disposed, said cartridges having end cap portions, the end cap portions of said cartridges having a transverse dimension substantially equal to the inner dimensions of said conduit, spacers within each of said cartridges, said spacers dividing the interior of said cartridges into a plurality of compartments, and means of cyclically feeding said cartridges into one end of said conduit, said conduit having a discharge end remote from said one end from which said cartridges are dispensed.

6. Apparatus comprising an elongated conduit, means for cyclically feeding articles to be dried into said conduit, means for causing said articles to be moved along the length of said conduit and to be discharged from the opposite end of said conduit, means spaced along the length of said conduit for reducing the pressure within said conduit, heating means associated with said conduit for selectively varying the temperature of said articles at spaced points along the length of said coinduit, an overhead support, and brackets for supporting said conduit in depending relation from said overhead support.

7. A drying apparatus comprising a refrigerated chamber, an elongated conduit extending from said chamber, said conduit having an inlet end within said chamber and a discharge end without said chamber, means for reducing the pressure in said conduit, means for introducing heat into said conduit at spaced points along the length of said conduit with the highest temperature being in an intermediate portion of said conduit, cartridges for containing the articles to be dried, said cartridges being of a dimension for passing through said conduit, a spacer of good heat conducting material in said cartridges so that heat will be radiated from said spacer to the articles to be dried, and means for cyclically feeding said cartridges to be dried into the inlet end of said conduit within said chamber, said cartridges being dispensed from the discharge end of said conduit.

8. A drying apparatus comprising an elongated conduit, means for reducing the pressure in said conduit, means for introducing heat into said conduit at spaced points along the length of said conduit with the highest temperature being in an intermediate portion of said conduit, cartridges for the articles to be dried, said cartridges being of a dimension for capable of passing through said conduit, a spacer of good heat conducting material in said cartridges so that heat will be radiated from said spacer to the articles to be dried, the thickness of the material of said spacer being at least .5% of the transverse dimension of said cartridge, and means for cyclically feeding said cartridges into one end of said conduit, said conduit having a discharge end remote from said one end from which dried articles are dispensed.

9. A drying apparatus comprising a refrigerated chamber, an elongated conduit extending from said chamber, said conduit having an inlet end within said chamber and a discharge end without said chamber, means for reducing the pressure in said conduit, means for introducing heat into said conduit at spaced points along the length of said conduit with the highest temperature being in an intermediate portion of said conduit, black cartridges of high emissivity in which articles to be dried are disposed, said cartridges being of sufficient size so that they pass through the said conduit, and means for cyclically feeding said cartridges into said inlet end of said conduit within said chamber, said dried articles and cartridges being dispensed from the discharge end of said conduit.

10. A drying apparatus comprising an elongated conduit, means for reducing the pressure in said conduit, means for introducing heat into said conduit at spaced points along the length of said conduit with the highest temperature being in an intermediate portion of said conduit, said means for introducing heat into the conduit including an electromagnetic wave tube connected to said conduit between said discharge end and said intermediate portion so that electromagnetic heat energy in wave form is introduced into said conduit, and means for cyclically feeding articles to be dried into one end of said conduit, said conduit having a discharge end remote from said one end from which dried articles are dispensed.

References Cited by the Examiner
UNITED STATES PATENTS

| | | | |
|---|---|---|---|
| 2,552,360 | 5/51 | Zichis | 34—5 |
| 2,554,560 | 5/51 | Craig | 34—92 X |
| 2,585,825 | 2/52 | Nyrop | 34—5 |
| 2,668,364 | 2/54 | Colton | 34—5 |
| 2,751,687 | 6/56 | Colton | 34—5 |
| 2,846,319 | 8/58 | Kelly | 34—92 X |
| 2,858,795 | 11/58 | Walker. | |
| 2,971,350 | 2/61 | Mills | 62—272 |

NORMAN YUDKOFF, *Primary Examiner.*